United States Patent [19]

König et al.

[11] Patent Number: 4,590,236

[45] Date of Patent: May 20, 1986

[54] PROCESS FOR THE PRODUCTION OF HYDROPHOBICIZING AND OLEOPHOBICIZING AGENTS

[75] Inventors: Joachim König; Carlhans Süling, both of Odenthal; Christian Lindner, Cologne, all of Fed. Rep. of Germany

[73] Assignee: Bayer Aktiengesellschaft, Leverkusen, Fed. Rep. of Germany

[21] Appl. No.: 703,093

[22] Filed: Feb. 19, 1985

[30] Foreign Application Priority Data

Feb. 29, 1984 [DE] Fed. Rep. of Germany ....... 3407361

[51] Int. Cl.$^4$ .............................................. C08F 2/16
[52] U.S. Cl. ............................................... 524/460
[58] Field of Search ........................................ 524/460

[56] References Cited

U.S. PATENT DOCUMENTS

| | | | |
|---|---|---|---|
| 3,179,534 | 4/1965 | Law | 428/274 |
| 3,403,122 | 9/1968 | Sherman et al. | 526/289 |
| 3,407,247 | 10/1968 | Reinhardt | 260/881 |
| 3,425,863 | 2/1969 | Honig | 427/387 |
| 3,501,448 | 3/1970 | Pittman et al. | 428/290 |
| 3,520,863 | 7/1970 | Arello et al. | 526/229 |
| 3,870,767 | 3/1975 | Grimaud | 260/836 |
| 3,919,183 | 11/1975 | Jager et al. | 526/248 |
| 4,312,914 | 1/1982 | Guth | 428/290 |
| 4,508,775 | 4/1985 | Adiletta | 428/288 |

FOREIGN PATENT DOCUMENTS

| | | |
|---|---|---|
| 2155133 | 5/1973 | France . |
| 2156786 | 6/1973 | France . |
| 2319668 | 7/1975 | France . |
| 1123379 | 8/1968 | United Kingdom . |

OTHER PUBLICATIONS

Chemical Abstracts 42–Coatings, vol. 69, 1968, 52990s, pp. 52990, 52991.

*Primary Examiner*—Joseph L. Schofer
*Assistant Examiner*—N. Sarofim
*Attorney, Agent, or Firm*—Connolly & Hutz

[57] ABSTRACT

The present invention relates to a process for the production of emulsions containing graft copolymers of ethylenically unsaturated perfluoroalkyl monomers on acrylate dispersions and to the use thereof as hydrophobicizing and oleophobicizing agents.

4 Claims, No Drawings

PROCESS FOR THE PRODUCTION OF HYDROPHOBICIZING AND OLEOPHOBICIZING AGENTS

This invention relates to a process for the production of emulsions containing graft copolymers of ethylenically-unsaturated perfluoroalkyl monomers on acrylate dispersions and to the use thereof as hydrophobicizing and oleophobicizing agents.

Polymers containing perfluoroalkyl groups are suitable substances for imparting hydrophobic and oleophobic finishes to textiles or carpets. These polymers are preferably used in the form of aqueous emulsions.

The production of aqueous emulsions by the known methods of emulsion polymerisation is, however, difficult because ethylenically-unsaturated perfluoroalkyl monomers are extremely water-insoluble and incapable of forming stable emulsions in water.

In U.S. Pat. No. 3,403,122 there is described a process for producing perfluoroalkyl polymers in aqueous media by emulsion polymerisation.

To increase the monomer solubility, these contain from 5 to 50% of water-soluble organic substances, e.g. acetone or methanol. The products obtained are in most cases coarse dispersions which have little storage stability. Moreover, water-soluble organic solvents, such as acetone or methanol, are precipitating agents for many polymers so that this process is inapplicable to many of the copolymerisation systems conventionally used.

U.S. Pat. No. 3,068,187 describes segmented copolymers, i.e. block or graft copolymers of ethylenically-unsaturated perfluoroalkyl monomers with ethylenically-unsaturated monomers containing less than 10% of fluorine and the production thereof by emulsion polymerisation. The monomer containing less than 10% of fluorine, e.g. butadiene or chloroprene, is pre-polymerised in aqueous emulsion and the perfluoroalkyl monomer is polymerised or grafted either subsequently or simultaneously. In these cases, the addition of water-soluble solvents, such as acetone or methanol, is necessary to bring about emulsification of the perfluoroalkyl monomers. These solvents, however, reduce the stability of the emulsion and may in unfavourable cases even bring about complete coagulation.

To obviate these disadvantages, solution polymerisation is employed in most cases. The reaction medium used normally consists of water-insoluble solvents, e.g. methyl isobutyl ketone, halogenated hydrocarbons or acetic acid esters, which are suitable solvents both for the monomers and for the polymers. Emulsification of this polymer solution in water with the aid of specialised emulsifying apparatus or homogenizers in most cases enables sufficiently finely divided and storage stable dispersions to be obtained. However, this method is complicated and expensive on account of the subsequent emulsification required, so that the need for a technically simpler procedure, such as polymerisation, is still unfulfilled.

It has now been found that storage stable dispersions which have a hydrophobicizing and oleophobicizing action may be obtained by polymerising ethylenically-unsaturated perfluoroalkyl monomers, optionally in admixture with other ethylenically-unsaturated comonomers which are free from perfluoroalkyl groups, by graft polymerisation in the presence of aqueous acrylate dispersions, with the addition of water-immiscible solvents capable of dissolving the perfluoroalkyl monomers and initiators which are soluble in the water-immiscible solvents added.

The present invention relates to a process for the production of aqueous dispersions of graft copolymers, characterised in that an aqueous acrylate dispersion is used as graft base and ethylenically-unsaturated perfluoroalkyl monomers, optionally in admixture with other ethylenically unsaturated comonomers which are free from perfluoroalkyl groups, are polymerised on this graft base, with the addition of water-immiscible solvents capable of dissolving the perfluoroalkyl monomers and initiators which are soluble in the water-immiscible solvents added.

The present invention further relates to the use of these dispersions as hydrophobicizing and oleophobicizing agents for textiles.

Aqueous acrylate dispersions are known. They may comprise homo- or co-polymers of alkyl(meth)acrylates with other vinyl monomers. Examples of suitable polymerisable (meth)acrylic acid esters include $C_1$–$C_8$-alkyl esters, such as methyl methacrylate, ethyl acrylate, butyl acrylate, isobutyl acrylate, octyl acrylate or 2-ethyl-hexyl acrylate, halogenated alkyl esters, such as chloroethyl acrylate, and aromatic esters, such as benzyl or phenethyl acrylate. Further examples of copolymerisable vinyl monomers include acrylonitrile, vinyl chloride, vinyl acetate, styrene, butadiene, acrylic acid, methacrylic acid or acrylamide. The acrylate polymers may be un-crosslinked or partially or highly crosslinked. Polyfunctional monomers, for example, may be copolymerised for the purpose of cross-linking. Examples include esters of unsaturated carboxylic acids with a polyol, e.g. ethylene glycol dimethacrylate or diethylene glycol dimethacrylate, esters of a polybasic carboxylic acid with an unsaturated alcohol, such as triallyl cyanurate or triallyl isocyanurate, divinyl compounds, such as divinyl benzene, esters of unsaturated carboxylic acids with unsaturated alcohols, such as allyl methacrylate, and 1,3,5-triacryloyl-hexahydro-s-triazine.

Acrylate latices which have a high capacity for grafting are preferred. This may be achieved, for example, by copolymerizing the acrylates with small quantities of conjugated dienes, such as butadiene, or with graft-active monomers. Examples of suitable graft-active monomers include allyl(meth)acrylate, triallyl(iso)cyanurate, citric acid triallyl esters, etc.

Acrylate latices which have a core-shell structure, for example, are also suitable. In these latices, the core may differ in its cross-linking or composition from the acrylate shell which has the composition described above. Such core-shell acrylate rubbers are described, for example, in EP-A 34748.

The above-mentioned acrylate dispersions may be used as graft base in solid concentrations of from 10 to 80%, by weight, (based on the total solids content after the grafting reaction). From 20 to 90%, by weight, (based on the total solids content), of ethylenically-unsaturated perfluoroalkyl monomers may also be used for the grafting reaction, optionally in admixture with comonomers which are free from perfluoroalkyl groups.

The ethylenically-unsaturated perfluoroalkyl monomers used for the grafting reaction contain saturated perfluorinated aliphatic alkyl groups which may be linear, branched or optionally cyclic. They contain at least four perfluorinated carbon atoms. Acrylates and methacrylates corresponding to general formulae (1a) and (1b) are suitable:

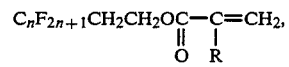  (1a)

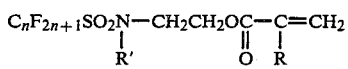  (1b)

In the above general formulae,
R represents H or CH$_3$;
R' represents H, CH$_3$, C$_2$H$_5$, C$_3$H$_7$, C$_4$H$_9$, C$_5$H$_{11}$ or C$_6$H$_{13}$; and
n represents an integer of from 4 to 20, preferably from 4 to 12.

The following are examples: N-methyl-N-perfluorobutane sulphonamidoethyl-methacrylate, N-methyl-perfluorooctane sulphonamidoethylacrylate, N-methyl-N-perfluorooctane sulphonamidoethyl-methacrylate, N-ethyl-N-perfluorooctane sulphonamidoethyl-methacrylate and N-propyl-N-perfluorooctane sulphonamidoethylacrylate. Mixtures of perfluoroalkyl monomers may be used.

Examples of other suitable comonomers include ethylenically-unsaturated monomers capable of being copolymerised with the perfluoroalkyl monomers, e.g. butadiene, isoprene, chloroprene, styrene, α-methylstyrene, p-methylstyrene, vinyl halides, such as vinyl chloride, vinylidene chloride, vinylidene fluoride, vinyl esters, such as viyl acetate, vinyl propionate, vinyl stearate, vinyl methyl ketone, acrylic acid, methacrylic acid, maleic acid anhydride, acrylic acid esters and methacrylic acid esters, such as methyl acrylate, methyl methacrylate, ethyl acrylate, ethyl methacrylate, propyl acrylate, butyl acrylate, 2-ethyl-hexylacrylate or methacrylate, decyl acrylate, lauryl acrylate or methacrylate, stearyl methacrylate, N,N-dimethyl-aminoethyl methacrylate, 2-hydroxyethyl methacrylate, 2-hydroxypropyl methacrylate and glycidyl methacrylate, amides, such as acrylamide, methacrylamide, N-methylol acrylamide, acrylonitrile or methacrylonitrile, and N-substituted maleic imides.

Mixtures of these comonomers are also suitable.

These comonomers may be used in quantities of from 0 to 60%, by weight, based on the total solids content, the sum of all percentages amounting to 100%, by weight.

The grafting reaction may be carried out in the presence of the acrylate dispersion as graft base. The ethylenically-unsaturated perfluoroalkyl monomers and optionally comonomers which are free from perfluoroalkyl groups are introduced into the receiver in the form of liquids, e.g. as a monomer mixture, as a solution or as an aqueous emulsion and grafted on the graft base by polymerisation, e.g. with the aid of radical initiators. The solvents used for producing the solution or aqueous emulsion may be sparingly soluble or insoluble in water, but must be capable of dissolving the perfluoroalkyl monomers as well as the optionally used comonomers which are free from perfluoroalkyl groups. Examples of suitable solvents include ketones, such as methyl isobutyl ketone, fatty acid esters, such as methyl acetate, ethyl acetate, butyl acetate or ethyl propionate, and halogenated hydrocarbons, such as methylene chloride, chloroform, carbon tetrachloride, tetrachloroethane, fluorotrichloromethane or 1,1,2-trifluoro-1,2,2-trichloroethane. The comonomer which is free from perfluoroalkyl groups may in some cases itself serve as solvent for the perfluoroalkyl monomer.

The grafting reaction may be carried out in the presence of conventional radical-forming initiators which are soluble for example, in the water-insoluble solvents added or in the monomer mixture.

The following are examples of initiators: peroxides, such as dibenzoyl peroxide, diacetyl peroxide, dilauroyl peroxide, di-t-butyl peroxide, cumene hydroperoxide, t-butyl peroctoate, azo compounds, such as azoisobutyric acid dinitrile etc.

The use of graft activators is indicated for improving the grafting yields. These activators are substances or monomers which have a high transfer activity and are capable of increasing the grafting yields when used in small quantities. Examples include olefins, such as propylene or isobutylene, vinyl chloride, vinyl acetate and triallyl cyanurate. Regulators, such as allyl compounds or mercaptans, may also be used to adjust the molecular weights.

Conventional anion-active, cation-active or non-ionic emulsifiers may be used to stabilize the dispersions. Examples of anion-active emulsifiers include alkyl sulphonates, alkyl aryl sulphonates, fatty alcohol sulphates and sulphosuccinic acid esters, emulsifiers containing perfluoroalkyl groups, such as the ammonium or tetraethyl ammonium salts of perfluorooctane sulphonic acid or the potassium salt of N-ethyl-N-perfluorooctane sulphonyl glycine. Examples of cation-active emulsifiers include quaternary ammonium and pyridinium salts, e.g. stearyl dimethylbenzyl ammonium chloride or N,N,N-trimethyl-N-perfluorooctane sulphonamidopropyl ammonium chloride. Examples of non-ionic emulsifiers include polyglycol ethers, e.g. ethyleneoxide/propylene oxide block or copolymers, reaction products of ethylene oxide or propylene oxide with fatty alcohols, with alkyl phenols, with fatty acids or fatty acid amides, with esterified sorbitol or with N-alkyl-N-perfluorooctane sulphonyl glycine.

Combinations of non-ionic emulsifiers with cation-active or anion-active emulsifiers are particularly suitable. It may be advisable to adjust stabilisation to the emulsifier system of the acrylate dispersion, for example by using similarly charged emulsifiers.

The graft copolymers according to the present invention may be obtained in the form of stable aqueous dispersions preferably having a solids content of from 5 to 50%, by weight. It is particularly advantageous that the dispersions be degasified by conventional distillation methods, e.g. in rotary evaporators or thin layer evaporators, for removing solvents or volatile monomer residues without the risk of coagulation, such as occurs in many known emulsions containing perfluoroalkyl polymers. The dispersions obtained after degasification are odourless and have a high stability in storage.

The dispersions according to the present invention may be used to form films which have excellent hydrophobic and oleophobic characteristics. The dispersions are eminently suitable, for example, as impregnating agents for imparting oil-repellence and water-repellence to natural and man-made materials, e.g. textiles of natural and synthetic fibers, carpets, paper, hides and leather.

EXAMPLE 1

Production of an acrylate dispersion 750 g of deionized water and 2 g of sodium ($C_{12}$–$C_{14}$) alkyl sulphonate are introduced into a reactor at 67° C. with stirring.

After initiation using a solution of 2 g of potassium peroxysulphate in 50 g of water, the following solutions are fed in separately in the course of 5 hours at 67° C.:

| Solution 1 | 750 g butyl acrylate |
| --- | --- |
|  | 750 g styrene |
|  | 5 g triallyl cyanurate |
| Solution 2 | 25 g sodium ($C_{12}C_{14}$) alkyl sulphonate |
|  | 1,790 g deionized water. |

Polymerisation is then carried out for 4 hours at 67° C. The latex obtained has a solids content of 36.5%, by weight. The polymer has a gel content of 92%, by weight. The latex particle size ($d_{50}$-value) is 190 nm (diameter).

EXAMPLE 2

Example 1 is repeated, but without the use of triallyl cyanurate in solution 1.

The latex obtained has a solids content of 36.7%, by weight. The polymer obtained is soluble in organic solvents. The latex particle size ($d_{50}$-value) is 150 nm (diameter).

EXAMPLE 3

The following solutions are prepared at 70° C.:

| Solution 1 | 92.8 g N—methyl-N—perfluorooctane sulphonaminoethyl methacrylate |
| --- | --- |
|  | 23.2 g stearyl methacrylate |
|  | 174.0 g methyl isobutyl ketone |
|  | 6.0 g polyglycol ether of sorbitan monooleate ("Tween 80") |
| Solution 2 | 302.0 g deionized water |
|  | 6.0 g potassium salt of N—ethyl-N—perfluorooctane sulphonyl glycine. |

Solutions 1 and 2 are mixed by means of an ultrasound disperser to prepare a monomer emulsion 3 which is used for the following grafting reaction:

300 g of an acrylate dispersion (prepared according to Example 1) are introduced into a stirrer flask and heated to 75° C. under nitrogen. The following are introduced at a uniform rate over a period of 2 hours at 75° C.:

| 600 g of monomer emulsion 3 and a solution of |
| --- |
| 6.0 g of dilauroyl peroxide in 100 g of methyl isobutyl ketone. |

The reaction mixture is then stirred for 1 hour at 75° C. and diluted with 500 g of deionized water.

To degassify the reaction mixture, about 400 g of distillate are removed on a rotary evaporator at 60° C. and 200 mbar. 1100 g of a stable, almost odourless dispersion free from solid precipitate are obtained as residue.

| Solids content | 20.6% |
| --- | --- |
| Fluorine content in solid substance | 16.8% |

EXAMPLE 4

A monomer emulsion is prepared analogously to Example 3 at 70° C. from:

| Solution 1 | 69.6 g N—methyl-N—perfluorooctane sulphonamidoethyl methacrylate |
| --- | --- |
|  | 46.4 g butyl acrylate |
|  | 174.0 g methyl isobutyl ketone |
|  | 6.0 g polyglycol ether of sorbitan monooleate ("Tween 80") |
| Solution 2 | 302.0 g deionized water |
|  | 6.0 g potassium salt of N—ethyl-N—perfluorooctane sulphonyl glycine. |

300 g of an acrylate dispersion (prepared according to Example 2) are introduced into a stirrer flask and heated to 75° C. under $N_2$. 600 g of monomer emulsion 3 and a solution of 6.0 g of dilauroyl peroxide in 100 g of methyl isobutyl ketone are added at a uniform rate over a period of 2 hours at 75° C. The reaction mixture is then stirred for 1 hour at 75° C. and diluted with 400 g of deionized water.

The dispersion may be degasified by removal of about 400 g of distillate in a rotary evaporator at 60° C. and 200 mbar. 1000 g of a stable, almost odourless dispersion free from solid precipitate are obtained.

| Solids content | 22.0% |
| --- | --- |
| Fluorine content in solid substance | 14.4%. |

EXAMPLE 5

A monomer emulsion is prepared at 70° C. in a manner analogous to Example 3 from:

| Solution 1 | 80.0 g N—methyl-N—perfluorooctane sulphonamido-ethyl-methacrylate |
| --- | --- |
|  | 20.0 g stearyl methacrylate |
|  | 1.0 g triallyl cyanurate |
|  | 150.0 g methyl isobutyl ketone |
|  | 5.15 g polyglycol ether of sorbitan monooleate ("Tween 80") |
| Solution 2 | 260.0 g deionized water |
|  | 5.15 g potassium salt of N—ethyl-N—perfluorooctane sulphonyl glycine |

250 g of an acrylate dispersion (prepaed according to Example 1) are introduced into a stirrer flask and heated to 75° C. under $N_2$. 510 g of the monomer emulsion and a solution of 5.0 g of dilauroyl peroxide in 100 g of methyl isobutyl ketone are added at a uniform rate in the course of 2 hours at 75° C. and the reaction mixture is then stirred for 1 hour at 80° C.

After dilution with 400 g of deionized water, about 400 g of distillate are removed on a rotary evaporator at 60° C. and 200 mbar. 850 g of a stable, almost odourless dispersion free from solid precipitate are obtained.

| Solids content | 21.8% |
| --- | --- |
| Fluorine content in solid substance | 21.0%. |

We claim:

1. A process for the production of an aqueous dispersion of a graft copolymer comprising, graft polymerizing graft monomers, comprising ethylenically-unsaturated perfluoroalkyl monomers having saturated perfluorinated aliphatic alkyl groups containing at least four perflorinated carbon atoms, onto an aqueous acrylate dispersion graft base, in the presence of a water-insoluble solvent capable of dissolving the graft monomers and of initiators which are soluble in the water-insoluble solvent.

2. A process according to claim 1 further comprising graft polymerizing in the presence of a graft activator having a high transfer activity.

3. A process according to claim 1 further comprising, the graft monomers are an admixture of the ethylenically-unsaturated perfluoroalkyl monomers and ethylenically-unsaturated monomers which are free from perflourinated carbon atoms.

4. An aqueous dispersion of a graft copolymer producted in accordance with claim 1.

* * * * *